(12) United States Patent
Fiala et al.

(10) Patent No.: US 9,339,833 B2
(45) Date of Patent: May 17, 2016

(54) COMPACT FLUID DELIVERY SYSTEM FOR AUTOMATION

(71) Applicant: FORD MOTOR COMPANY, Dearborn, MI (US)

(72) Inventors: Aaron Fiala, Newport, MI (US); Scott Adams, Milan, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 75 days.

(21) Appl. No.: 14/272,693

(22) Filed: May 8, 2014

(65) Prior Publication Data
US 2015/0321210 A1 Nov. 12, 2015

(51) Int. Cl.
*B05B 3/00* (2006.01)
*B05B 15/04* (2006.01)
*B05B 13/04* (2006.01)
*B05B 12/14* (2006.01)
*B25J 11/00* (2006.01)

(52) U.S. Cl.
CPC ........... *B05B 15/0406* (2013.01); *B05B 12/149* (2013.01); *B05B 12/1418* (2013.01); *B05B 12/1454* (2013.01); *B05B 13/0431* (2013.01); *B25J 11/0075* (2013.01); *Y10S 901/01* (2013.01); *Y10S 901/27* (2013.01); *Y10S 901/43* (2013.01)

(58) Field of Classification Search
CPC .................................................... B05B 13/0431
USPC ......................... 118/321, 323; 901/43, 28, 29; 74/490.01, 490.06
See application file for complete search history.

(56) References Cited

U.S. PATENT DOCUMENTS

| | | | |
|---|---|---|---|
| 2003/0042340 A1* | 3/2003 | Clifford | B05B 12/14 239/690 |
| 2010/0196616 A1* | 8/2010 | Clifford | B05B 5/1633 427/459 |
| 2011/0166708 A1* | 7/2011 | Herre | B05B 13/0431 700/258 |

OTHER PUBLICATIONS

"Monoline Coaxial Paint Circulating System," https://www.hosco.net/catalog-of-products/paint-system-accessories/monoline-co-axial-paint-circulating-system, 1 pg., accessed May 8, 2014.

* cited by examiner

*Primary Examiner* — Yewebdar Tadesse
(74) *Attorney, Agent, or Firm* — Damian Porcari; Brooks Kushman P.C.

(57) ABSTRACT

In at least one embodiment, a paint applicator robot is provided. The robot may include a robotic arm including a hollow joint and a paint applicator, a color tree disposed between the hollow joint and the paint applicator, and a dual-lumen line extending through the hollow joint to the color tree. The dual-lumen line may include a paint supply path to the color tree and a paint return path from the color tree. The robot may include a plurality of the dual-lumen lines, for example, up to 48 dual-lumen lines, each providing a paint color to the color tree. The robot may be included in a robotic paint station and may be configured to receive paint from and return paint to a drop box connected to a paint recirculation system.

18 Claims, 4 Drawing Sheets

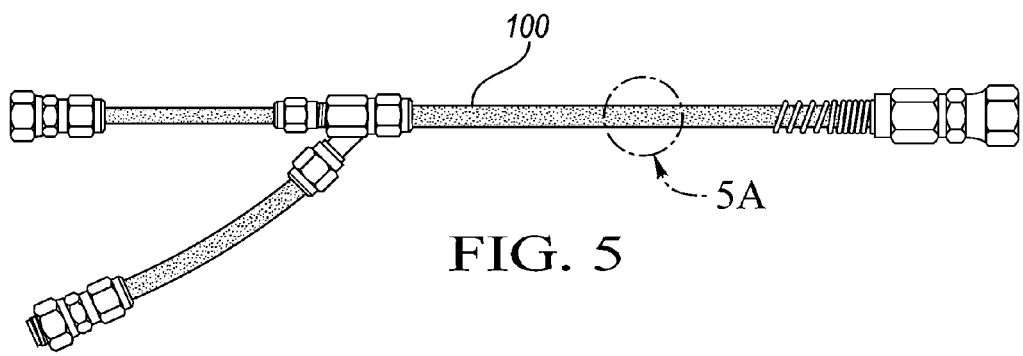
FIG. 5
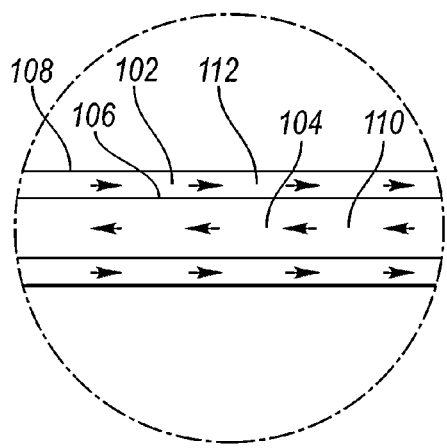
FIG. 5A
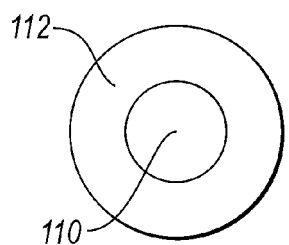       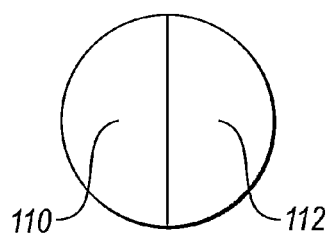       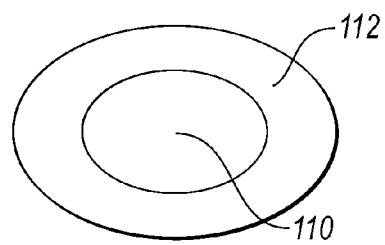
FIG. 6A            FIG. 6B            FIG. 6C

COMPACT FLUID DELIVERY SYSTEM FOR AUTOMATION

TECHNICAL FIELD

This disclosure relates to compact fluid delivery systems for automation, for example, in automated paint systems.

BACKGROUND

Modern manufacturing painting processes, including those used for automotive vehicles, may generally utilize a paint circulation system capable of delivering a plurality of paint colors. As color may be an important characteristic to the customer, particularly in the area of vehicles, providing a large range of colors is important. Each color may have a separate distribution system, including a network of supply and return lines, a plurality of paint applicators, such as spray guns or rotary bells, and a circulation pump that operates to continuously circulate the paint within the system. The paint circulation system as a whole may include a plurality of paint reservoirs or tanks, which may include a tote tank and a day tank for each color, pumps, supply and return lines, drop lines, one or more spray booths, a heat exchanger, one or more pressure regulators, and one or more paint applicator robots.

SUMMARY

In at least one embodiment, a paint applicator robot is provided. The robot may include a robotic arm including a hollow joint and a paint applicator, a color tree disposed between the hollow joint and the paint applicator, and a dual-lumen line extending through the hollow joint to the color tree. The dual-lumen line may include a paint supply path to the color tree and a paint return path from the color tree.

The dual-lumen line may include a first line having a first outer diameter and a second line having a second outer diameter that is larger than the first diameter, the second line surrounding the first line. The first line and the second line may form concentric circles in transverse cross-section. The first line may have an inner diameter defining a first lumen and the second line may have a second lumen defined between an inner diameter of the second line and the outer diameter of the first line. The first lumen may define a first flow path and the second lumen may define a second flow path. The first flow path may be configured to be the paint return path and the second flow path is configured to be the pain supply path. Alternatively, the first flow path may be configured to be the paint supply path and the second flow path may be configured to be the pain return path.

In one embodiment, the dual-lumen line may be configured to extend from the color tree, through the hollow joint, and couple to a drop box of a paint recirculation system. The robot may be a stationary robot or a rail-mounted robot. The robot may include a plurality of dual-lumen lines extending through the hollow joint to the color tree, each dual-lumen line including a paint supply path to the color tree and a paint return path from the color tree. The plurality of dual-lumen lines may include 35-48 dual-lumen lines and the color tree may be configured to receive and distribute 35-48 colors.

In at least one embodiment, a paint applicator robot may be provided including a robotic arm including a hollow joint, a paint applicator, and a color tree disposed between the hollow joint and the paint applicator. The robot may further include a plurality of dual-lumen lines extending through the hollow joint to the color tree, each dual-lumen line including concentric paint supply and paint return paths.

Each dual-lumen line may include a first line having a first outer diameter and a second line having a second outer diameter that is larger than the first diameter, the second line surrounding the first line. The first line may have an inner diameter defining a first lumen and the second line may have a second lumen defined between an inner diameter of the second line and the outer diameter of the first line, the first lumen defining a first flow path and the second lumen defining a second flow path. Each dual-lumen line may be configured to extend from the color tree, through the hollow joint, and couple to a drop box of a paint recirculation system.

In at least one embodiment, a robotic paint station is provided. The paint station may include a drop box configured to receive paint from and return paint to a paint recirculation system and a paint applicator robot. The robot may include a hollow joint and a color tree, and the robot may be configured to receive paint from and return paint to the drop box. The station may further include a dual-lumen line extending through the hollow joint and including a paint supply path to the color tree and a paint return path from the color tree.

Each dual-lumen line may include a first line having a first outer diameter and a second line having a second outer diameter that is larger than the first diameter, the second line surrounding the first line. The first line may have an inner diameter defining a first lumen and the second line may have a second lumen defined between an inner diameter of the second line and the outer diameter of the first line, the first lumen defining a first flow path and the second lumen defining a second flow path. In one embodiment, the dual-lumen line may extend from the drop box to the color tree. In another embodiment, the dual-lumen line may couple to a paint supply line and a paint return line and the paint supply line and the paint return line may couple to the drop box.

BRIEF DESCRIPTION OF THE DRAWINGS

FIGS. 5 and 5A are a partial cutaway view of a dual-lumen line according to an embodiment;

FIGS. 6A-6C are cross-sections of a dual-lumen line according to several embodiments;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
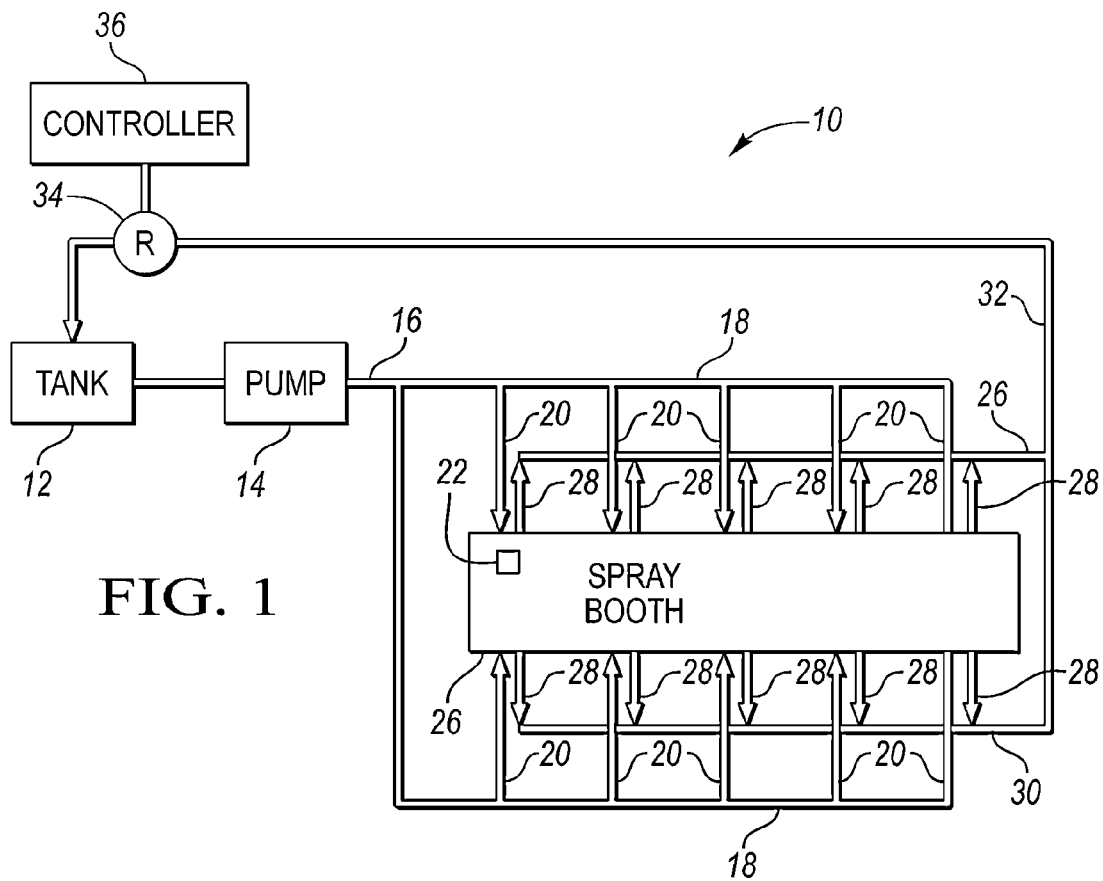
FIG. 1 is a schematic view of a paint recirculation system.

With reference to FIG. 1, a parallel paint circulation system is disclosed, referred to generally at 10. The paint circulation system 10 may include one or more paint reservoirs or tanks 12. Each paint color in the system may have at least one tank 12, for example a large tote tank and a day tank. A pump 14 may supply paint from each color tank 12 (e.g., a day tank) through a paint supply conduit 16 to a paint supply header 18. Therefore, there may be a plurality of headers 18, one for each paint color. A plurality of supply drop lines 20 may be connected to each paint supply header 18 and supply paint to a paint station 22. Each paint station 22 may include a robot 24 having a paint applicator such as a spray gun or rotary bell used to apply paint to a work piece in the spray booth 26. A plurality of return drop lines 28 may be connected to the paint station 22 to return unused paint to a paint return header 30. A paint return conduit 32 may be provided to return the paint through a back pressure regulator 34. The back pressure regulator 34 may be operated by a controller 36. A second back pressure regulator may be provided as an additional means to control the flow of the paint circulating through the system 10.

While FIG. 1 illustrates a parallel paint circulation system, the paint circulation system may also be a pressure differential paint circulation system or any other type of paint circulation system known in the art. One difference between the pressure differential system and the parallel system is that the pressure differential system may include a connector conduit having a valve or in-line restrictor disposed between the paint supply header and the paint return conduit. The in-line restrictor may operate to provide additional control and means to regulate the pressure within the paint circulation system. While paint circulation systems have been described generally, one having ordinary skill in the art will be aware that certain components may be added or removed from the system and/or components may be rearranged or altered.

Figure 2:
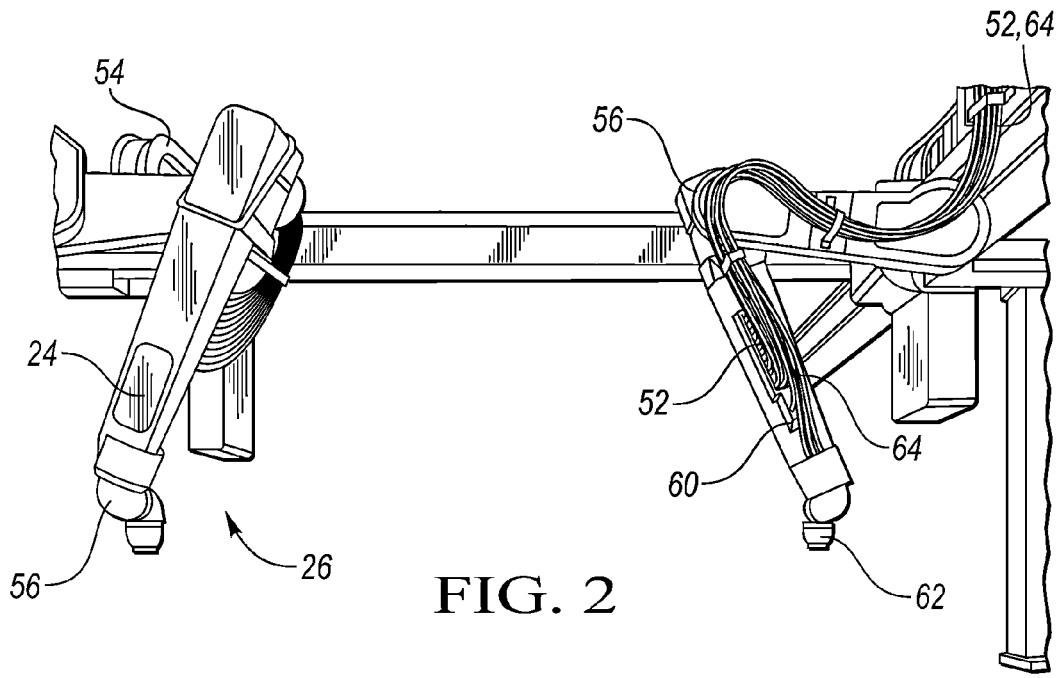
FIG. 2 is a perspective view of a paint spray booth.
Figure 3:
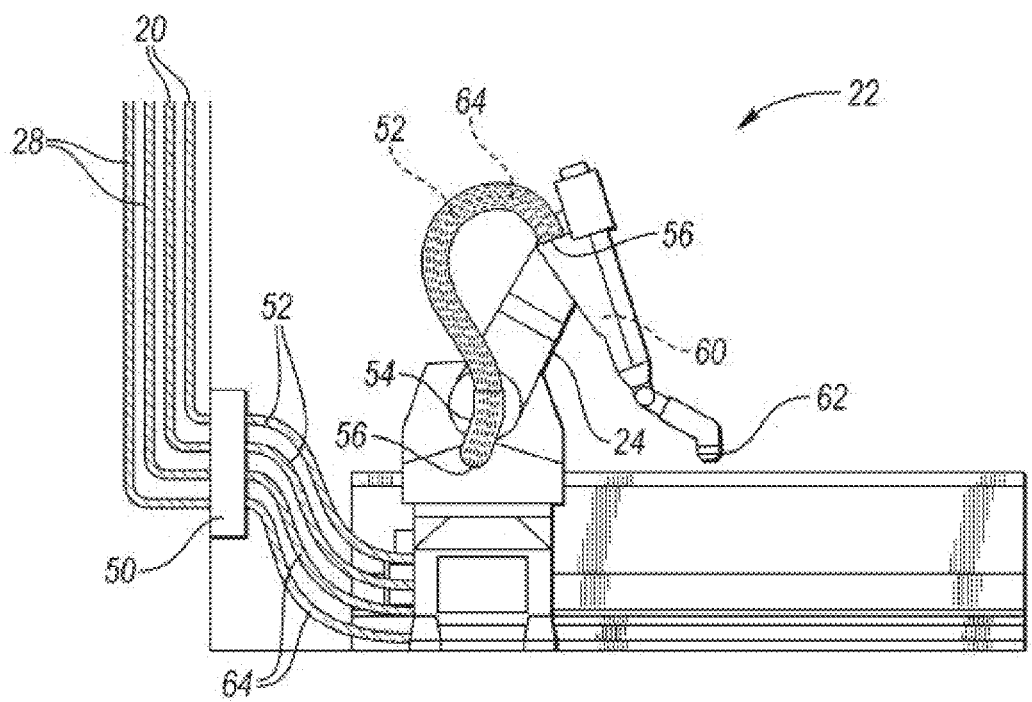
FIG. 3 is a schematic view of a robotic paint station.

With reference to FIGS. 2 and 3, each paint station 22 may include at least one paint applicator robot 24. One or more paint stations 22 may be included in a spray booth 26. The supply drop lines 20 may enter a drop box 50 at each paint station 22. Supply lines 52 may then transfer each paint color to a robot 24. The robots 24 may be any suitable paint applicator robots, such as floor or ceiling mounted painting robots. The robots 24 may be mounted on cat-tracks 54 in order to allow linear movement (e.g., horizontal or lateral movement). Examples of suitable robots 24 may include painting robots manufactured by Fanuc, such as the P-500, P-700, and P-1000 series robots. The robots 24 may include one or more joints or bends 56 that allow for pivoting, bending, rotating, or other motions. The joints may be analogous to human arm joints, for example, a shoulder, elbow, and/or wrist. The one or more joints 56 may provide the robots 24 with up to 6 degrees of freedom.

The supply lines 52 may travel from the drop box 50, through the cat-tracks 54 (if present), and into the robots 24. The supply lines 52 may be run through hollow sections or space 58 in the joints 56. To keep the supply lines 52 tightly packed together, brackets, ties, sleeves, or other forms of restriction may surround the supply lines 52. The supply lines 52 may connect to a color tree 60 (also called a color block or color changer) located within the robot 24. The color tree 60 may be located adjacent to an applicator 62 of the robot, which sprays or applies the paint to an object (e.g., a vehicle). In order to prevent the paint from standing in the lines, return lines 64 may extend from the color tree 60 and return the paint through the joints 56 of the robot 24 and back to the drop box 50. From the drop box 50, the paint travels to return drop lines 28, then to the return header 30 and return conduit 32, and ultimately back to the tank 12 where the paint is recirculated.

Figure 4:
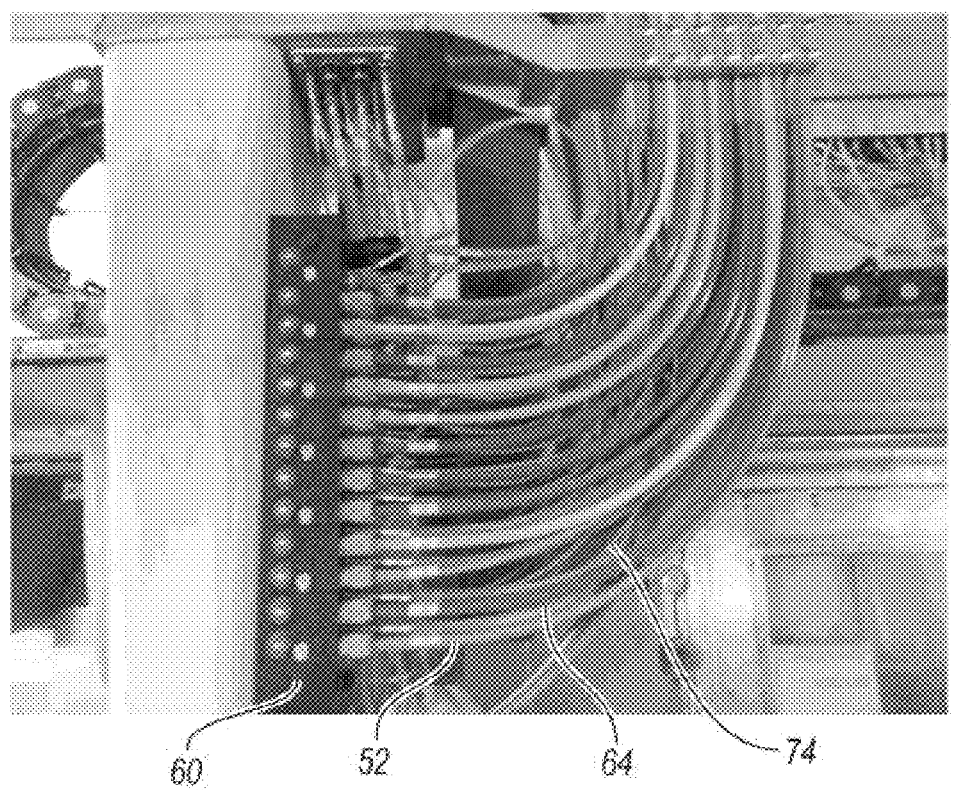
FIG. 4 is a photograph of a color tree inside a painting robot.

With reference to FIG. 4, conventional color trees generally include separate sets of supply lines and return lines. The supply lines connect to one portion of the color tree and a separate set of return lines connect to another portion of the color tree to recirculate the colors not currently being applied. Within the color tree, connections between the supply and return lines for each color allow for the paint to be circulated when the colors are not being applied. Each supply line also is connected to an applicator line 70 that provides paint to the applicator 62. When a certain color is chosen to be applied, the connection between the supply and return lines is closed and the connection to the applicator line 70 is opened, allowing the chosen paint color to flow to the applicator 62. When a color change is made, the applicator line 70 may be cleaned by a solvent 72. The solvent may be provided to the color tree via one or more solvent lines 74. Each supply line may include an associated solvent line 74 for cleaning the lines within the color tree either prior to or after that color is used (or both).

Accordingly, in conventional color trees, for each color option that is provided there is a supply line and a separate return line. A typical supply or return line has an outer diameter (OD) of about 10-12 mm and an internal diameter (ID) of about 8 mm. Therefore, the supply and return lines for each color option each require a cross sectional area within the robot joints of about 113 mm$^2$ (total of 226 mm$^2$ total per color). However, this area does not account for the empty space between the lines due to imperfect packing of circular cross-sections. The hollow space 58 in the joints 56 may have an approximately circular cross-section and may generally have a diameter of about six (6) inches for the first joint 56 (which is generally the largest). The cross-sectional area of the hollow space 58 may therefore be approximately 28.3 in$^2$ (18,241 mm$^2$). In addition to the paint supply and return lines, other equipment must be passed through the hollow space 58, such as compressed air lines, solvent lines, and other wires or hoses. On top of the cross sectional area limitations within the joints of the robots, there are also additional considerations such as the volume within the robot at the connections to the color trees and maintenance requirements (e.g., wrench clearance limitations). As a result of these space limitations, the maximum number of colors that may be provided to the color tree for current robot paint applicators is 24 (which requires a total of 48 supply and returns lines). Based on the cross-sectional area of the first joint 56, current robots are able to accommodate approximately one color per 760 mm$^2$ of cross-sectional area.

The number of colors available has become a very important consideration for automotive consumers. Customers may expect a large variety of colors and may desire more exotic or unconventional colors than are traditionally available. A paint system that is limited to 24 colors, as the conventional system is, cannot provide the variety that consumers demand. It may be possible to replace all existing painting automation equipment (e.g., robots, paint booths, facilities, etc.), however, doing so would be extremely cost prohibitive. Larger painting robots that could accommodate significantly more colors may not be commercially available and may need to be designed from scratch. In addition, increasing the size of the robots can have negative effects on the robot performance, such as reduced agility. Accordingly, a solution is needed that allows for more colors options to be provided without significant changes to the paint system robots and their supporting infrastructure.

With reference to FIGS. 5-8, a coaxial, "tube-in-tube," or dual-lumen supply and return system is provided to address the issue of adding more color options without enlarging robots or significantly adding to/modifying the existing system. Instead of having completely separate supply and return lines, the supply lines 52 and the return lines 64 may be combined into a single dual-lumen line 100. The dual-lumen line 100 may have two separate flow paths, a supply path 102 and a return path 104. The dual-lumen line 100 may include a first, smaller diameter line or hose 106 and a second, larger diameter line or hose 108 that surrounds the first hose 106, as shown in FIG. 6A. The first and second hoses 106 and 108 may therefore form concentric hoses with one inside the other. The first hose 106 may provide a first flow path 110 within its internal diameter and the second hose 108 may provide a second flow path 112 between an outer diameter of the first hose 106 and an inner diameter of the second hose 108. In one embodiment, the first flow path 110 may be the return path 104 and the second flow path 112 may be the supply path 102. However, the flow paths could also be switched such that the first flow path 110 is the supply path 102 and the second flow path 112 is the return path 104.

In addition to concentric hoses, other configurations that combine two hoses into a hose having a single outer diameter may also be used in the disclosed system. One example, shown in FIG. 6B, may include a hose having a circular cross-section divided into two hoses having semi-circular cross-sections to create the first and second flow paths 110 and 112. In addition to hoses having circular cross-sections, the dual-lumen line 100 could have a non-circular cross-section, such as rectangular or oval, such as shown in FIG. 6C. The first and second hoses 106 and 108 could therefore include concentric rectangular, square, or oval hoses or could be divided in half (e.g. diagonally, across a major or minor axis, or otherwise), as described above with respect to circular hoses. As used in this disclosure, "dual-lumen line" includes all of the above-mentioned configurations of supply and return lines combined into a single structure.

Concentric hoses for manual paint application are available, such as the Monoline system from Hosco, however, automated painting systems all use separate supply and return lines. The concentric hoses were developed for manual paint sprayers to reduce the number of lines, and therefore the trip hazard, caused by separate supply and return lines. The cross-sectional area of the lines is not a factor in manual sprayers, since there are no tight joints for the lines to pass through, like in paint robots. In addition, concentric hoses have significantly higher pressure drop compared to separate supply and return lines. Therefore, the length of the dual-lumen line may be limited, which is problematic for rail mounted paint robots that must have lines long enough to accommodate substantial linear travel. To implement the dual-lumen lines 100 in the system 10, the input pressure may need to be significantly raised in order to overcome the increased pressure drop. Shortening the dual-lumen lines 100 may allow for conventional, or only slightly increased, input pressure to be used. Line shortening may be accomplished by using stationary pedestal paint robots, such as the Fanuc P-1000.

By replacing separate supply and return lines 52 and 64 with a single dual-lumen line 100, significant space savings can be achieved, which may allow for additional color options to be added to the paint system without significant changes to the robots and supporting infrastructure. While the dual-lumen lines 100 may individually have a slightly larger diameter than each of the supply line and return lines 52 and 64, the total increase in cross sectional area is reduced since the number of lines is reduced by half. Since the cross-sectional area increases proportionate to the square of the radius, a small increase in the diameter of the dual-lumen lines 100 may allow for the same total cross-sectional area of the supply and return paths compared to the conventional lines 52 and 64. In one embodiment, the first flow path 110 (e.g., the inside line) may have an inner diameter (ID) of about 4-8 mm and an outer diameter (OD) of about 6-10 mm. The second flow path 112 (e.g., the outer line) may have an ID of about 10-14 mm and an OD of about 12-16 mm.

Due to the increased number of shear planes acting on the fluid flow in the second flow path 112 (e.g., the inner surface of the outer line and the outer surface of the inner line), the cross-sectional area of the second flow path 112 may be larger than the cross-sectional area of the first flow path 110, in order to compensate. The total cross-sectional area of the dual-lumen lines may therefore be the same or lower, per color, compared to separate supply and return lines. In addition, since the number of hoses per color is reduced by half, the number of gaps between lines is also greatly reduced per color. The gaps between the lines are empty, wasted space, therefore reducing the number of gaps frees up significant space for additional colors.

The dual-lumen lines 100 may have fittings at each end that are configured to control the flow paths 110 and 112. The fitting on one end of the dual-lumen line 100 may be configured to connect to a color tree 60. The fitting on this end may allow paint supplied from the second flow path 112 (e.g., the outer line) to enter the first flow path 110 (e.g., the inner line) when that particular paint color is not in use. The paint is therefore recirculated from the supply path 102 to the return path 104. When a particular paint color is selected at the color tree 60, a valve within the color tree opens and allows paint to flow to the applicator line 70. When the valve is opened, the pressure in the applicator line 70 is significantly lower than the pressure in the supply path 102 (and, in some instances, the return path 104) and the paint flows from one or both of the paths 102 and 104 into the applicator line 70. Accordingly, the single fitting of the dual-lumen line 100 attached to the color tree 60 replaces the two separate fittings in conventional systems (one for the supply line 52 and one for the return line 64). This reduction in the number of fittings per color significantly reduces the area required per color on the color tree. Each fitting must be accessible for maintenance and therefore requires space around the fitting for tool access (e.g., wrench clearance). By replacing two separate fittings with a single fitting for the dual-lumen lines 100, area on the color tree 60 is freed up to accommodate additional color options.

A fitting on the other end of the dual-lumen line 100 may be configured to split the flow paths 110 and 112 back into two separate hoses so that the dual-lumen line 100 can be coupled to conventional separate supply and return lines. For example, the fitting may allow the dual-lumen line 100 to couple to existing supply drop lines 20 and return drop lines 28 at the drop box 50.

When a color change is made, solvent 72 from solvent lines 74 may be provided in a manner similar to that described above for conventional paint systems to clean the applicator line 70 and related internal components of the color tree 60 and prepare it for a new color. The solvent 72 may be mixed with air using a solvent-air mixer to provide improved cleaning ability. The solvent-air mixer may continuously mix air with the solvent to provide an aerated solvent or air and solvent may be alternately provided to the applicator line 70. In conventional systems, pain supply and return lines are cleaned using a liquid solvent that is circulated through the system in the same or similar manner as the paint itself. Since each paint color has a separate supply and return line, the liquid solvent adequately cleans both lines. In systems using dual-lumen lines 100, however, there may be instances where the outer surface of the inner line contacts the inner surface of the outer line, for example, when the lines 100 make sharp bends around corners. Using the conventional liquid solvent-only approach to cleaning the dual-lumen lines 100 may therefore not be adequate to clean these difficult areas. In one embodiment, a solvent-air mixer may be used to clean the dual-lumen lines 100. Mixtures of solvent and air or alternating pulses of solvent and air may be circulated through the dual-lumen lines 100 in order to provide increased cleaning power. The increased cleaning power may therefore better clean the areas where the inner and outer lines make contact. In one embodiment, the same solvent-air mixer used to clean the color tree 60 may be used to back flush the lines 100 for a certain color, thereby eliminating the need for a separate mixer and additional piping and equipment. For spray booths having potentially dozens of robots, each having 30, 35, 40+ colors, this use of existing equipment may provide significant cost and equipment savings. Using the same solvent-air mixer may also improve safety, since the cleaning can be initiated by an operator remote from the robot itself. This may reduce the danger of a spark igniting the aerated solvent while a person is nearby.

Figure 7:
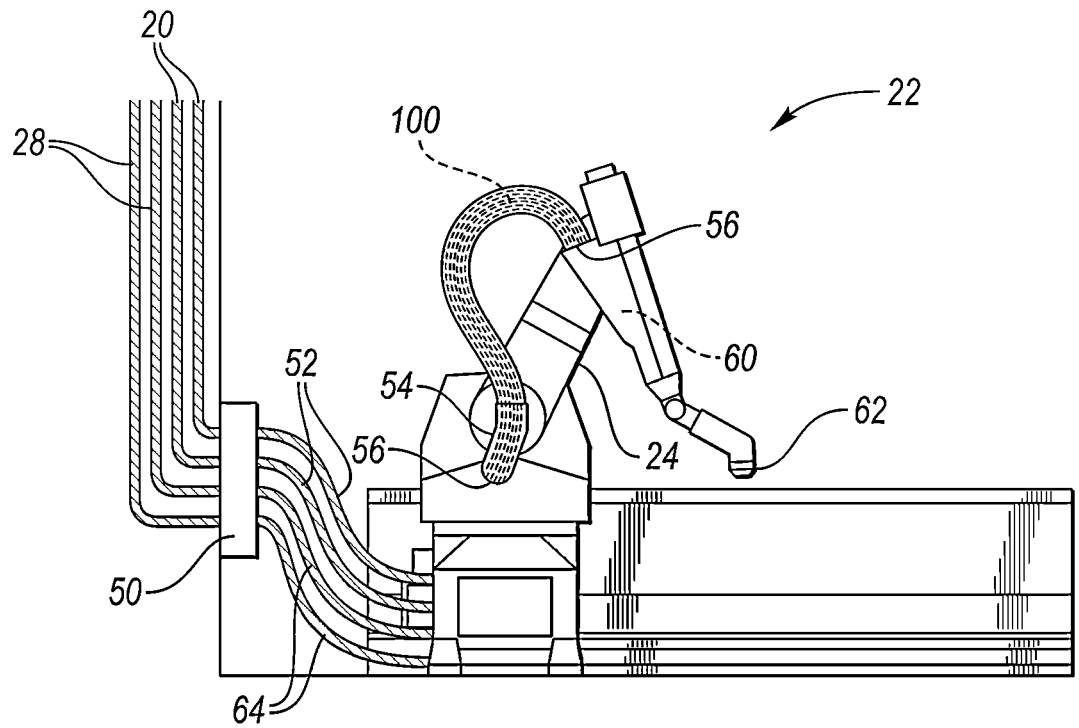
FIG. 7 is a schematic view of a robotic paint station according to an embodiment.

In one embodiment, dual-lumen lines 100 may extend from the drop box 50 to the color tree 60. The dual-lumen lines 100 would therefore extend through the cat-track (if present), through the joints 56 of the robot 24, and connect to the color tree 60. In another embodiment, the dual-lumen lines 100 may only comprise a portion of the supply and return lines extending from the drop box 50 to the color tree 60 in the robot 24, as shown in FIG. 7. For example, a portion 120 of the supply and return lines may include the conventional separate supply and return lines 52 and 64 and a portion 122 of the supply and return lines may include dual-lumen lines 100.

In one embodiment, conventional, separate supply and return lines 52 and 64 may be coupled to the drop box 50 and extend through the cat-track (if present) to the robot 24. A transition may then be made from the conventional, separated lines to dual-lumen lines 100 at or near the base of the robot 24 (e.g., in a bulkhead). The dual-lumen lines 100 may then extend through the robot 24 and its joints 56 to the color tree 60. Since space within the robot joints 56 is more limited than space in the paint booth in general, this embodiment may allow for the dual-lumen lines 100 to only be installed where the need to save space is more urgent. In addition, as described above, dual-lumen lines 100 may have substantially increased pressure drop compared to the conventional, separate lines 52 and 64. This increased pressure drop may practically limit the length of the dual-lumen lines 100 that may be used in the system 10. Accordingly, in embodiments where the robot 24 is a stationary robot (e.g., pedestal robot), the dual-lumen lines 100 may extend from the drop box 50 all the way to the color tree 60. In embodiments where the robot 24 is rail mounted and has a cat-track, the dual-lumen lines 100 may extend from the color tree 60 and through at least a portion of or the entire robot 24. The dual-lumen lines 100 may then be coupled to conventional lines 52 and 64 that connect to the drop box 50.

Due to the reduction in cross-sectional area as a result of using dual-lumen lines 100 instead of conventional, separate supply and return lines 52 and 64, it may be possible to provide substantially more color options using a single robot applicator without increasing the robot size. In one embodiment, up to 48 color options may be provided to a single color tree within a robot (e.g., double the current amount). For example, 30 to 48 colors may be provided to a single color tree within a robot. Any sub-range of colors may also be provided, such as 35 to 48, 40 to 48, 35-45, 35 to 40, or others. It is of course also possible to replace separate supply and return lines with dual-lumen lines 100 without increasing the number of color options (e.g., up to about 24) or only increasing the color options by a small number (e.g., to 25-30), since doing so would still reduce line congestion within the robot joints, provide additional room for maintenance or other equipment, potentially allow greater freedom of movement for the robot, or other reasons.

Figure 8:
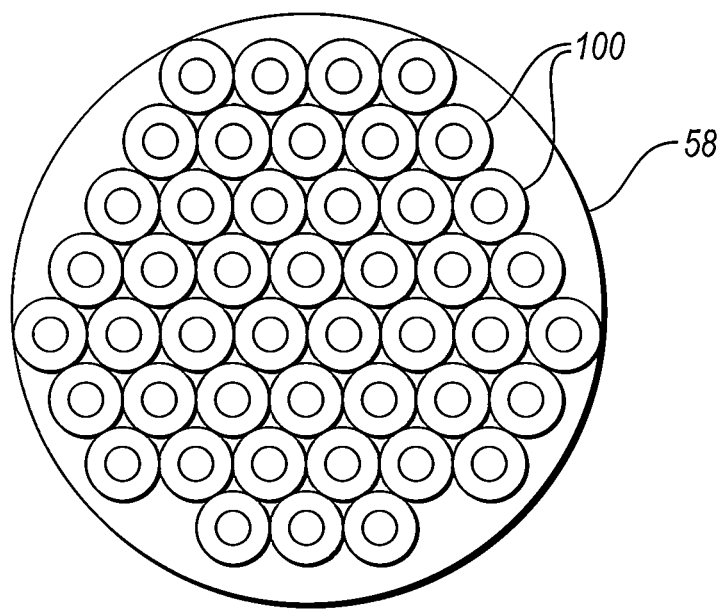
FIG. 8 is a schematic cross-section of a painting robot joint including dual-lumen lines according to an embodiment.

As discussed above, robots 24 have joints 56 with a limited amount of cross-sectional area inside. Rather than quantifying the number of total colors that a color tree with dual-lumen lines 100 may receive, the number of color options may be expressed as an area per color. For example, if the robot joint has a hollow space 58 with a diameter of 6 inches (area of approximately 28.3 in$^2$ or 18,241 mm$^2$) and 46 color options are provided using dual-lumen lines 100, as shown in FIG. 8, then there may be one color per 397 mm$^2$.

Since the supply and return connections in the color tree are in combined in systems using the dual-lumen lines 100, the shape and/or configuration of the color tree may be changed from the conventional rectangular form factor. Since each color option only requires one line 100, it is not necessary for there to be two separate supply and return connections. Rather, each dual-lumen line 100 can attach in any manner or location. Due to the increased number of color options, it may be advantageous to modify the shape, form factor, or configuration of the color tree in order to accept the increased number of colors. Each dual-lumen line 100 may still require wrench clearance, so the lines may be offset from one another to provide additional space between connections. In addition, the shape of the color tree may be modified from a generally rectangular structure to a half-cylinder structure, a half-moon structure, or some other full or half prism structure. For example, the color tree may be a full or half hexagonal or octagonal prism. Providing multiple, angled faces may allow for more color options to be included while still allowing space for maintenance (e.g., wrench clearance limitations).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A paint applicator robot comprising:
   a robotic arm including a hollow joint and a paint applicator;
   a color tree disposed between the hollow joint and the paint applicator; and
   a plurality of dual-lumen lines extending through the hollow joint to the color tree, each dual-lumen line including a paint supply path to the color tree and a paint return path from the color tree;
   wherein the plurality of dual-lumen lines includes 35-48 dual-lumen lines each having a single end-fitting and the color tree is configured to receive and distribute 35-48 paint colors, each paint color having only a single connection on the color tree connected to the single end-fitting of one of the 35-48 dual-lumen lines.

2. The robot of claim 1, wherein each of the dual-lumen lines includes a first line having a first outer diameter and a second line having a second outer diameter that is larger than the first diameter, the second line surrounding the first line.

3. The robot of claim 2, wherein the first line and the second line form concentric circles in transverse cross-section.

4. The robot of claim 2, wherein the first line has an inner diameter defining a first lumen and the second line has a second lumen defined between an inner diameter of the second line and the outer diameter of the first line, the first lumen defining a first flow path and the second lumen defining a second flow path.

5. The robot of claim 4, wherein the first flow path is configured to be the paint return path and the second flow path is configured to be the paint supply path.

6. The robot of claim 4, wherein the first flow path is configured to be the paint supply path and the second flow path is configured to be the paint return path.

7. The robot of claim 1, wherein each of the dual-lumen lines are configured to extend from the color tree, through the hollow joint, and couple to a drop box of a paint recirculation system.

8. The robot of claim 1, wherein the robot is a stationary robot.

9. The robot of claim 1, wherein the robot is a rail-mounted robot.

10. A paint applicator robot comprising:
a robotic arm including a hollow joint, a paint applicator, and a color tree having 30-48 paint color connections, one per paint color, disposed between the hollow joint and the paint applicator; and
30-48 dual-lumen lines extending through the hollow joint to the color tree, each dual-lumen line including concentric paint supply and paint return paths and a single end-fitting connected to one of the 30-48 paint color connections.

11. The robot of claim 10, wherein each dual-lumen line includes a first line having a first outer diameter and a second line having a second outer diameter that is larger than the first diameter, the second line surrounding the first line.

12. The robot of claim 11, wherein the first line has an inner diameter defining a first lumen and the second line has a second lumen defined between an inner diameter of the second line and the outer diameter of the first line, the first lumen defining a first flow path and the second lumen defining a second flow path.

13. The robot of claim 10, wherein each dual-lumen line is configured to extend from the color tree, through the hollow joint, and couple to a drop box of a paint recirculation system.

14. A robotic paint station comprising:
a drop box configured to receive paint from and return paint to a paint recirculation system;
a paint applicator robot including a hollow joint and a color tree having 30-48 paint color connections, one per paint color, the robot configured to receive paint from and return paint to the drop box; and
30-48 dual-lumen lines extending through the hollow joint to the color tree, each dual-lumen line including concentric paint supply and paint return paths and a single end-fitting connected to one of the 30-48 paint color connections of the color tree.

15. The robot of claim 14, wherein each dual-lumen line includes a first line having a first outer diameter and a second line having a second outer diameter that is larger than the first diameter, the second line surrounding the first line.

16. The robot of claim 15, wherein the first line has an inner diameter defining a first lumen and the second line has a second lumen defined between an inner diameter of the second line and the outer diameter of the first line, the first lumen defining a first flow path and the second lumen defining a second flow path.

17. The robot of claim 14, wherein each of the dual-lumen lines extends from the drop box to the color tree.

18. The robot of claim 14, wherein each of the dual-lumen lines couples to a paint supply line and a paint return line and the paint supply line and the paint return line couple to the drop box.

* * * * *